United States Patent [19]

Szczesniak et al.

[11] 4,075,357
[45] Feb. 21, 1978

[54] INTERMEDIATE MOISTURE MEATS

[75] Inventors: Alina Surmacka Szczesniak, Mount Vernon; Wei-Wen Mao, Ossining, both of N.Y.

[73] Assignee: General Foods Corporation, White Plains, N.Y.

[21] Appl. No.: 672,571

[22] Filed: Mar. 31, 1976

[51] Int. Cl.$^2$ .......................... A23B 4/00; A23B 4/02

[52] U.S. Cl. .................................. 426/332; 426/641; 426/643; 426/644

[58] Field of Search ............... 426/332, 335, 532, 266, 426/641, 262, 265, 574, 643, 644, 645, 652

[56] References Cited

U.S. PATENT DOCUMENTS

3,099,566    7/1963    Hesch et al. .................... 426/266

FOREIGN PATENT DOCUMENTS

945,338    12/1963    United Kingdom ................ 426/266

OTHER PUBLICATIONS

Mahon, "Proceedings of The Thirteenth Research Conference", Article Cuppled—Tripolyphosphate—Salt Synergesun and its Effect on Cured Meat Volume—pp. 59–67.

*Primary Examiner*—Raymond N. Jones
*Assistant Examiner*—R. A. Yoncoskie
*Attorney, Agent, or Firm*—T. J. Carvis; D. J. Donovan; B. P. Struzzi

[57] ABSTRACT

Combinations of sodium chloride or potassium chloride with certain other salts provide a greater degree of water binding in meat products than they would be expected to have based on Raoult's Law. In addition, these salt combinations provide highly palatable products such as chicken, ham and shrimp when rehydrated prior to consumption. Preferred salt combinations contain sodium chloride and alkali metal citrates in a weight ratio of from 3:2 to 2:3 at a level of from 6 to 13% based on the total weight of the product which contains from above 30 to 45% water. The preferred process includes the steps of infusing the meats with an aqueous solution of the salt combinations and drying the infused meats to the desired moisture under conditions which avoid surface hardening.

25 Claims, No Drawings

INTERMEDIATE MOISTURE MEATS

BACKGROUND OF THE INVENTION

Since ancient times people have desired to preserve meats for long periods of storage. Recently, the art has evolved a number of intermediate-moisture preservation systems which enable storage under aerobic conditions. The present invention provides an improved system of this type.

The great majority of intermediate-moisture preservation systems rely on soluble solids such as sugars, salts, polyhydric alcohols, and the like which, due to their relatively low molecular weights and resultant high osmotic pressure effects render the water in these products unavailable to support bacterial growth. This effect has been explained on the basis of Raoult's Law. Much work has been focused on the sugars, polyhydric alcohols and other such water binders, and the art has largely overlooked the possibility that there may be combinations of certain salts which provide an unexpected degree of effectiveness and unusually good flavor.

SUMMARY OF THE INVENTION

It is an object of the present invention to provide specific salt combinations which show unexpected effectiveness in intermediate-moisture meat products.

It is another object of this invention to provide an improved process for preparing intermediate-moisture meats capable of rehydration into fresh-tasting cooked meats.

These and other objects are accomplished according to the present invention which provides an improved preservation system for meats containing from 15 to 50% moisture which are normally subject to bacterial growth, the preservation system comprising a primary salt selected from the group consisting of sodium chloride and potassium chloride, and at least one secondary salt selected from the group consisting of alkali metal salts of edible organic hydroxy carboxylic acids, alkali metal orthophosphates, alkali metal metaphosphates, alkali metal ultraphosphates, alkali metal polyphosphates and any combination of these, the ratio of sodium chloride to the secondary salt being from 1:3 to 3:1. This preservation system is employed according to the process of the present invention by incorporating it into the meats and establishing the moisture content of the meats at a level of from 15 to 50%.

DETAILED DESCRIPTION

The present invention identifies certain salt combinations which unexpectedly provide a greater degree of water binding effect than would be normally expected based on Raoult's Law. More importantly, these salt combinations enable the preservation of meats normally subject to bacterial growth at moisture contents of from 15 to 50%, and rehydration of these meats into really good tasting meat products. While the art has long been desirous of such a result, the prior art attempts based on the use of sugars, polyols, and the like, fall short of the mark. Moreover, the art's apparent preoccupation with sugars and polyols provides direction away from the use of salts—presumably for taste reasons. However, these sugars and polyols have limited application because they are compatible only with limited types of meat products, such as sweet and sour pork, sweet ham, and the like. The disclosed salt combinations, on the other hand, are compatible with all meat products since the slight salty flavor is clean and natural.

The preservation system of this invention is intended for all meats, such as chicken, ham, beef, lamb, pork, and the like, as well as fish, crustaceans, mollusks and the like. Also contemplated within the definition of meat are textured protein products based entirely or primarily on vegetable protein. These meats and synthetic meat products can be utilized for human and animal consumption. Good results have been achieved with chicken, ham and shrimp at moisture contents of above 30% and below 45%, and water activities, $a_w$, between 0.82 and 0.88.

The preservation system of this invention is based on a combination of at least one primary salt selected from the group consisting of sodium chloride and potassium chloride, with a secondary salt selected from the group consisting of alkali metal salts of edible organic hydroxy carboxylic acids such as citric, lactic, tartaric, malic and the like, and alkali metal salts of orthophosphate (such as mono-, di-, and tri-sodium orthophosphate), polyphosphate (such as tetra-sodium pyrophosphate and potassium tetrapolyphosphate), metaphosphate (such as sodium hexametaphosphate) and ultraphosphate (such as calcium ultraphosphate). The preferred primary salt is sodium chloride and the preferred secondary salts are sodium citrate and potassium citrate.

These salt combinations can provide the sole preservative against bacteria, and this is preferred. However, it is possible to employ levels of other known water binders such as sugars and polyols. For taste reasons, the other water binders should be present in very small amounts, generally less than 10%, preferably less than 5%, based on the weight of the product.

Similarly for taste reasons, the pH of the meats is preferably not adjusted outside the near-neutral natural range of from 5.5 to 8.0. However, because the meats are preferably cooked in aqueous media prior to consumption, lowering the pH with the usual food acids to a pH of as low as 3.0 can be useful. Typical of these food acids are citric, malic, fumaric, adipic, phosphoric, and the like.

Also, while bacterial growth will be controlled by the disclosed preservative system, it will usually be necessary to employ an antimycotic such as potassium sorbate, sodium sorbate, or the like, to prevent mold growth.

The weight ratio of the level of sodium chloride or potassium chloride to the secondary salt in the final product will range from about 1:3 to 3:1, preferably 1:2 to 2:1, with a ratio of from 2:3 to 3:2 being most often employed. The total level of this preservative system will depend on the moisture content of the product and any level effective to obtain bacteriostasis can be employed. Typically, levels of from 6 to 13% will be effective, with 8 to 10% being the preferred level for products within the preferred moisture range of from above 30 to 45%. Effective $a_w$ values can be as low as 0.60 and as high as 0.92, but generally are about 0.82 to 0.88.

To prepare the intermediate-moisture meat products of this invention, the starting meat is preferably fresh but can have been cooked and/or frozen or dried. The meat is preferably cut into pieces and then soaked at temperatures ranging from about 0° to 150° C, in an aqueous solution containing the salt combination of the present invention. Temperatures of from about 90° to 105° C are preferred, and ½ inch cubes are infused by holding at these temperatures for from about 5 to 25 minutes, followed by soaking in the solution for an additional ½ to 2 hours while the solution cools. The exact times and temperatures are not critical, however, and any effective levels can be employed. In one alternative embodiment, the infusion solution can contain flavoring materials and be retained with the final product to provide a gravy or sauce base.

After infusion, the meats are reduced to the desired moisture content by any means effective to obtain the desired moisture reduction without drying the surface to the extent that the surface becomes hard and discolored. Microwave treatment is effective, as is a conventional pasta dryer.

To utilize the products thus prepared, they are preferably rehydrated prior to consumption; however, they can be consumed as is. Rehydration can be accomplished in any suitable manner such as soaking in water at refrigerated, ambient, or elevated temperatures. Since many meats are consumed hot, rehydration may be conveniently accomplished by boiling in water. Flavoring materials may be added to the rehydration water. The exact moisture level for consumption is, however, a matter of taste.

The following examples are presented for the purpose of further explaining the present invention and are not to be taken as limiting in any regard. Unless otherwise indicated, all parts and percentages are by weight.

EXAMPLE I

One part of whole large shrimp is cooked seven minutes in two parts of a boiling solution which contains 5% sodium chloride, 5% potassium citrate, 0.8% potassium sorbate and 89.2% water. The shrimp are allowed to stand in the salt solution for 1 hour while cooling to about 30° to 40° C. The shrimp are drained and then dried in an air oven at 100° to 110° F to a moisture content of 39% and an $a_w$ of 0.85.

EXAMPLE II

The procedure of Example I is repeated, but this time ham is cut into approximately one half inch cubes, cooked and soaked. After drying to a moisture content of 38%, the ham has an $a_w$ of 0.85.

EXAMPLE III

The procedure of Example I is again repeated but this time the meat employed is one half inch cubes of chicken. At a final moisture content of 35%, it has an $a_w$ of 0.85.

This product is rehydrated in boiling water for about ten minutes. The rehydrated product had excellent organoleptic properties with a taste virtually indistinguishable from fresh chicken which had been boiled in lightly salted water.

EXAMPLE IV

The procedure of Example III is repeated but this time the drying is started with microwave for from 40 to 70 seconds and completed with the air oven at 35 to 45° C for up to 3 hours.

EXAMPLE V

The procedure of Example III is again repeated, but this time the drying air in the oven is maintained at a relative humidity of about 80%.

EXAMPLE VI

The procedure of Example III is again repeated, but this time a vacuum oven having a vacuum of 26 inches of mercury is employed at 35° to 45° C to do the drying.

EXAMPLE VII

The following composition was prepared:

| | |
|---|---|
| Ground chicken meat | 79.2% |
| Sodium Chloride | 5.5 |
| Potassium citrate | 4.5 |
| Potassium sorbate | 0.8 |
| Egg albumen | 10.0 |
| | 100.0% |

Following thorough mixing, the composition was kept refrigerated for 16 hours to allow the salts to penetrate into the meat and become evenly distributed. The composition was extruded into 1 × ½ × ¼ inch strips and heated for 30 minutes at 100° C to coagulate egg albumen and generate a solid, shape-holding product. Subsequently, the product was dried as in Example I.

EXAMPLE VIII 50 g of freeze-dried, pre-cooked chicken cubes of approximately 1–2% moisture were added to 50 g of an aqueous solution containing 12% NaCl, 8% potassium citrate and 1% potassium sorbate, mixed intimately, covered tightly and allowed to equilibrate for 48 hours. The resulting chicken product had 39% moisture and an $a_w$ of 0.88. It was moist and tender in eating qualities, unlike the starting material.

EXAMPLE IX 100 g of lean cooked beef cubes (about ½ inch) were mixed with 200 g of gravy mix of the following composition:

| | Percent |
|---|---|
| Sodium chloride | 5.0 |
| Sodium lactate | 5.0 |
| Potassium sorbate | 0.8 |
| Monosodium glutamate | 2.0 |
| Garlic powder | 0.1 |
| Onion powder | 1.0 |
| White pepper powder | 0.2 |
| Wesson oil | 10.0 |
| whole egg yolk | 10.0 |
| Myverol SMG Succinolylated monoglyceride | 0.5 |
| Non fat dry milk | 12.4 |
| Frodex 15 DE hydrolyzed cereal solids | 12.0 |
| Whey protein | 10.0 |
| All purpose flour | 12.0 |
| Water | 19.0 |
| | 100.0 |

The mixture was allowed to equilibrate for 24 hrs after which time the beef cubes had a reduced moisture content of 37% and an $a_w$ of 0.85, and the entire product was microbially stable without refrigeration. Upon addition of a suitable amount of water, the product yielded a tasty beef and gravy composition.

The above description is for the purpose of teaching those skilled in the art how to practice the present invention and does not attempt to describe in detail all of the obvious modifications and variations of the invention which will become apparent upon reading it. It is intended that all such modifications and variations be included within the scope of the present invention which is defined by the following claims.

What is claimed is:

1. An intermediate-moisture meat product comprising meat containing from 15 to 50% moisture which is normally subject to bacterial growth, having incorporated therein a preservation system comprising at least one primary salt selected from the group consisting of sodium chloride and potassium chloride and at least one secondary salt selected from the group consisting of alkali metal salts of edible hydroxy carboxylic acids, alkali metal orthophosphates, alkali metal metaphosphates, alkali metal ultraphosphates, alkali metal polyphosphates and any combination of these, the weight ratio of the primary salt to the secondary salt being from 1:3 to 3:1, and the total weight of primary salt and secondary salt being from 6 to 13% of the weight of the product.

2. An intermediate-moisture meat product according to claim 1 wherein the weight ratio of primary salt to secondary salt is from 1:2 to 2:1.

3. An intermediate-moisture meat product according to claim 1 wherein the weight ratio of primary salt to secondary salt is from 2:3 to 3:2.

4. An intermediate-moisture meat product according to claim 3 wherein the total weight of primary salt and secondary salt comprises from 8 to 10% of the weight of the product.

5. An intermediate-moisture meat product according to claim 1 wherein the primary salt comprises sodium chloride.

6. An intermediate-moisture meat product according to claim 5 wherein the moisture content is from above 30% less than 45% and the $a_w$ is from 0.82 to 0.88.

7. An intermediate-moisture meat product according to claim 6 wherein the weight of the sodium chloride and the secondary salt comprises from 8 to 10% of the product.

8. An intermediate-moisture meat product according to claim 7 wherein the meat is ham, chicken or shrimp.

9. A process for preparing an intermediate-moisture meat product containing 15 to 50% moisture and having an $a_w$ of between 0.60 and 0.92, which comprises: incorporating into the meat at least one primary salt selected from the group consisting of sodium chloride and potassium chloride and at least one secondary salt selected from the group consisting of alkali metal salts of edible hydroxy carboxylic acids, alkali metal phosphates, alkali metal metaphosphates, alkali metal ultraphosphates, alkali metal polyphosphates and any combination of these, the weight ratio of primary salt to secondary salt being from 1:3 to 3:1, to obtain a total weight of the primary salt and secondary salt being from 6 to 13% based on the weight of the final product.

10. An intermediate-moisture meat product comprising meat containing from 15 to 50% moisture which is normally subject to bacterial growth, having incorporated therein a preservation system comprising at least one primary salt selected from the group consisting of sodium chloride and potassium chloride and at least one secondary salt selected from the group consisting of sodium citrate and potassium citrate, the weight ratio of the primary salt to the secondary salt being from 1:3 to 3:1, and the total weight of primary salt and secondary salt being from 6 to 13% of the weight of the product.

11. An intermediate-moisture meat product according to claim 10 wherein the weight ratio of primary salt to secondary salt is from 1:2 to 2:1.

12. An intermediate-moisture meat product according to claim 10 wherein the total weight of primary salt and secondary salt comprises from 8 to 10% of the weight of the product.

13. An intermediate-moisture meat product according to claim 10 wherein the primary salt comprises sodium chloride.

14. An intermediate-moisture meat product according to claim 13 wherein the moisture content is from above 30% to less than 45% and the $a_w$ is from 0.82 to 0.88.

15. An intermediate-moisture meat product comprising meat containing from 30 to 45% moisture which is normally subject to bacterial growth, having incorporated therein a preservation system comprising at least one primary salt selected from the group consisting of sodium chloride and potassium chloride and at least one secondary salt selected from the group consisting of sodium citrate and potassium citrate, the weight ratio of the primary salt to the secondary salt being from 1:2 to 2:1, and the total weight of primary salt and secondary salt being from 6 to 13% of the weight of the product.

16. An intermediate-moisture meat product according to claim 15 wherein the primary salt comprises sodium chloride.

17. An intermediate-moisture meat product according to claim 16 wherein the meat is ham, chicken or shrimp.

18. An intermediate-moisture meat product according to claim 17 wherein the weight of the sodium chloride and the secondary salt comprises from 8 to 10% of the product.

19. An intermediate-moisture meat product comprising meat containing from 15 to 50% moisture which is normally subject to bacterial growth, having incorporated therein a preservation system comprising at least one primary salt selected from the group consisting of sodium chloride and potassium chloride and at least one secondary salt selected from the group consisting of sodium citrate and potassium citrate, the weight ratio of primary salt to secondary salt being from 2:3 to 3:2, and the total weight of primary salt and secondary salt being from 6 to 13% of the weight of the product.

20. An intermediate-moisture meat product according to claim 19 wherein the total weight of primary salt and secondary salt comprises from 8 to 10% of the weight of the product.

21. An intermediate-moisture meat product according to claim 19 wherein the primary salt comprises sodium chloride.

22. An intermediate-moisture meat product according to claim 19 wherein the moisture content is from above 30% to less than 45% and the $a_w$ is from 0.82 to 0.88.

23. An intermediate-moisture meat product according to claim 22 wherein the primary salt comprises sodium chloride.

24. An intermediate-moisture meat product according to claim 23 wherein the meat is ham, chicken or shrimp.

25. An intermediate-moisture meat product according to claim 24 wherein the total weight of primary salt and secondary salt comprises from 8 to 10% of the weight of the product.

* * * * *